US007209667B2

(12) United States Patent
Lindblad (10) Patent No.: US 7,209,667 B2
(45) Date of Patent: *Apr. 24, 2007

(54) METHODS OF CONNECTING AND TESTING INTERFACES FOR CWDM FIBER-OPTIC SYSTEMS

(75) Inventor: Tommy Lindblad, Norsborg (SE)

(73) Assignee: Transmode Systems AB, Stockholm (SE)

( * ) Notice: Subject to any disclaimer, the term of this patent is extended or adjusted under 35 U.S.C. 154(b) by 723 days.

This patent is subject to a terminal disclaimer.

(21) Appl. No.: 10/005,878

(22) Filed: Dec. 7, 2001

(65) Prior Publication Data

US 2003/0108282 A1    Jun. 12, 2003

(51) Int. Cl.
*H04B 10/00*    (2006.01)
(52) U.S. Cl. .................. 398/164; 398/135; 398/138; 398/139; 398/128; 398/130; 398/66; 398/67; 398/68; 398/70; 398/71; 398/72; 398/79; 398/82; 398/182; 398/202
(58) Field of Classification Search ............. 398/22, 398/66, 71, 72, 73, 76, 100, 138, 140, 164, 398/182, 202, 135, 139, 128, 130, 67, 68, 398/70, 79, 82
See application file for complete search history.

(56) References Cited

U.S. PATENT DOCUMENTS 5,202,780 A * 4/1993 Fussanger ................ 398/72
5,825,949 A * 10/1998 Choy et al. ............... 385/24
5,879,173 A    3/1999 Poplawski et al.
5,880,864 A * 3/1999 Williams et al. ........... 398/71
7,010,233 B2 * 3/2006 Lindblad .................. 398/164
2002/0093796 A1    7/2002 Medina
2002/0163687 A1    11/2002 Boden

FOREIGN PATENT DOCUMENTS

EP    0437161    7/1991
EP    0720322    7/1996

* cited by examiner

*Primary Examiner*—Hanh Phan
(74) *Attorney, Agent, or Firm*—Bingham McCutchen LLP (57) ABSTRACT

The invention concerns a method of connecting a subscriber unit (12) to a fiberoptic communication network (14) via a fiberoptic interface device (30) adapted to function as an interface device (30) in a coarse wavelength division multiplex (CWDM) system. The interface device (30) comprises an electric circuit arrangement (32) and a first (34) and a second (36) receiving section adapted to receive transceiver modules (24, 70). According to the method, an opto-electric transceiver module (24) is arranged in said first receiving section (34) and connected to said fiberoptic communication network (14). A first electric transceiver module (70) is provided and arranged in said second receiving section (36). The interface device (30) is connected, via said electric transceiver module (70), to said subscriber unit (12) via electrical conduction paths (82, 86). The invention also concerns a method of testing the function of said interface device (30).

8 Claims, 5 Drawing Sheets

METHODS OF CONNECTING AND TESTING INTERFACES FOR CWDM FIBER-OPTIC SYSTEMS

BACKGROUND OF THE INVENTION

1. Field of the Invention

The invention relates in general to methods involving interfaces adapted for use in coarse wavelength division multiplexing (CWDM) fiberoptic communication networks. Such interfaces are used to adapt, adjust or convert optical signals transmitted between different network units. Dense wavelength division multiplexing (DWDM) typically uses wavelength separations of about 1.6 nm. CWDM, on the other hand, typically has a wavelength separation in the order of about 20 nm. CWDM has inter alia the advantage that the different components used in the system are less expensive. Furthermore, the power requirements are usually lower compared to DWDM and also the physical size of the used laser is normally smaller and it is not cooled in a CWDM system.

2. Technical Background

Figure 1:
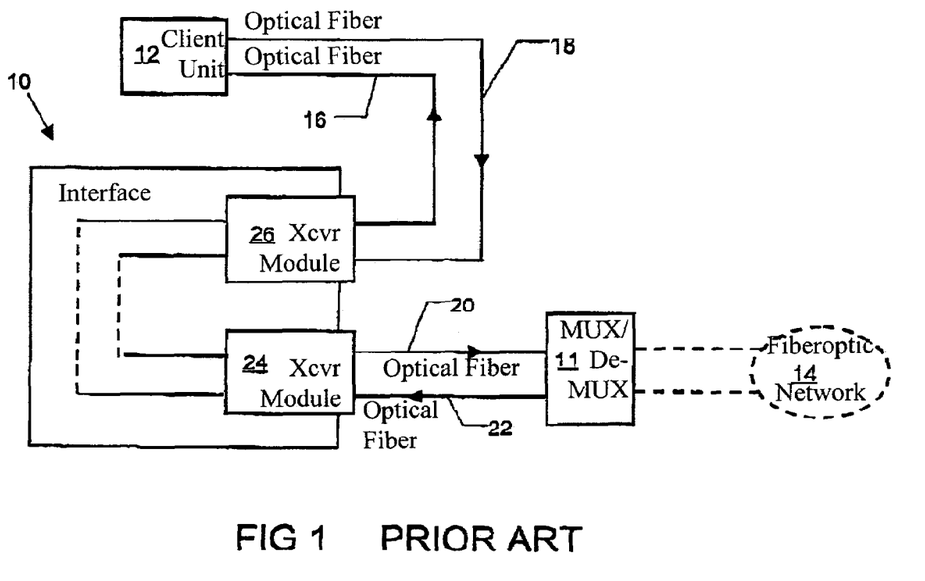
FIG. 1 shows an example of a fiberoptic network with an interface according to the prior art.

FIG. 1 shows an example of a part of a fiberoptic communication network according to the prior art. The figure shows a subscriber or client unit 12 connected to a larger fiberoptic network 14 via an interface 10 and a multiplexer/demultiplexer 11. In a typical case the subscriber may be a company which may also have its own fiberoptic network. The subscriber may, for example, obtain access to the larger fiberoptic network 14 by an agreement with another company, which can here be called the provider. The provider may have several clients which all are connected to the larger fiberoptic network 14. The larger fiberoptic network 14 may for example be the Internet. The connection between the subscriber unit 12 and the interface 10 is normally bi-directional, which in this document means that signals can be sent in two opposite directions, indicated by arrows in FIG. 1. The communication is normally implemented via two optical fibers 16, 18. Also the communication between the interface 10 and the multiplexer/demultiplexer 11 normally takes place over two optical fibers 20, 22. The interface 10 is used to adapt the signals from the client unit 12 to the multiplexer/demultiplexer 11 and vice versa. The interface 10 may, for example, carry out wavelength conversion, amplification, signal conditioning, data regeneration, noise reduction etc. The interface 10 normally includes means for converting optical signals from the client unit 12 to electrical signals and means for converting electrical signals to optical signals before they are transmitted to the multiplexer/demultiplexer 11. The interface 10 also normally includes means for converting optical signals from the multiplexer/demultiplexer 11 to electrical signals and means for converting electrical signals to optical signals before they are transmitted to the client unit 12. The conversion in the different directions may be carried out via transceivers, 24, 26 which form part of the interface 10. The transceivers 24, 26 can be formed as pluggable modules which can be plugged into a circuit board.

The client unit 12 may be located at a shorter or longer distance from the interface 10.

Figure 2:
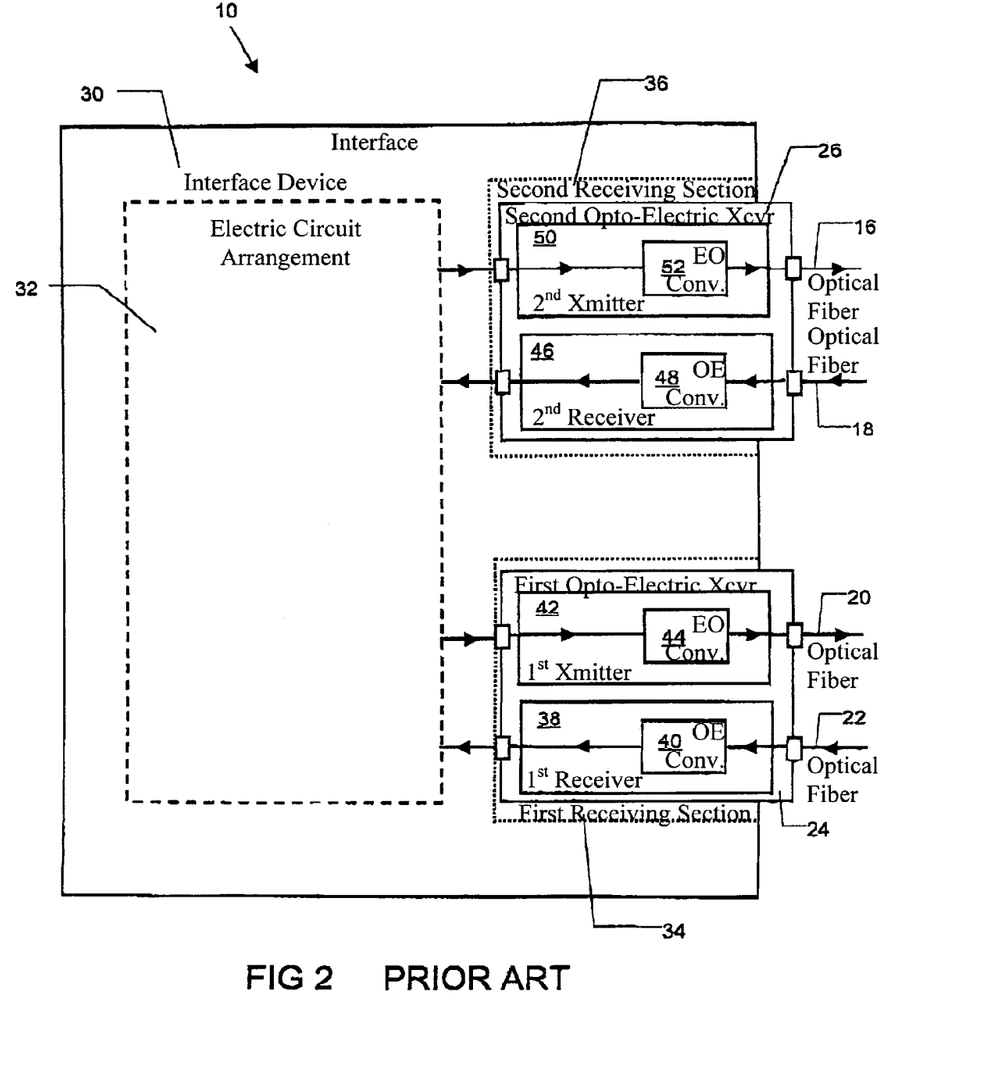
FIG. 2 shows an example of an interface according the prior art in more detail.

FIG. 2 shows in more detail an example of an interface 10 according to the prior art and thus a known manner of connecting a subscriber unit 12 to a fiberoptic communication network 14 via a fiberoptic interface 10, which is adapted to function as an interface in a coarse wavelength division multiplex (CWDM) system.

It should be noted that the interface, as the concept is used in this document, includes the attached transceiver modules 24, 26. The concept "interface device" does however refer to the interface without the transceiver modules 24, 26.

The interface device 30 comprises an electric circuit arrangement 32, a first receiving section 34 adapted to receive a first opto-electric transceiver module 24 and a second receiving section 36 adapted to receive a second opto-electric transceiver module 26. The first opto-electric transceiver module 24 includes a first receiver unit 38 for receiving optical signals from an optical conduction path 22, the first receiver unit 38 comprising a first opto-electrical converter 40 for converting the received optical signals to electrical signals, which are adapted to be conducted to said electric circuit arrangement 32. The first opto-electric transceiver module 24 also includes a first transmitter unit 42 for transmitting optical signals to an optical conduction path 20, the first transmitter unit 42 comprising a first electro-optical converter 44 for converting electrical signals, received from said electric circuit arrangement 32, to optical signals before they are transmitted from the transmitter unit 42.

The second opto-electric transceiver module 26 is similar to the first opto-electric transceiver module 24 and thus includes a second receiver unit 46 for receiving optical signals from an optical conduction path 18, the second receiver unit 46 comprising a second opto-electrical converter 48 for converting the received optical signals to electrical signals, which are adapted to be conducted to said electric circuit arrangement 32. The second opto-electric transceiver module 26 also includes a second transmitter unit 50 for transmitting optical signals to an optical conduction path 16, the second transmitter unit 50 comprising a second electro-optical converter 52 for converting electrical signals, received from said electric circuit arrangement 32, to optical signals before they are transmitted from the transmitter unit 50.

The first 34 and second 36 receiving sections can be designed such that said first 24 and second 26 opto-electric transceiver modules may be plugged into the respective receiving section 34, 36 and unplugged therefrom in a quick-connect manner.

The interface device 30, together with said attached first 24 and second 26 opto-electric transceiver modules, is arranged to adapt the signals from said subscriber unit 12 before transmitting the signals to said multiplexer/demultiplexer 11, and also to adapt signals from said multiplexer/demultiplexer 11 before they are transmitted to said subscriber unit 12.

As has been mentioned above, the interface device 30 is normally connected to the subscriber unit by attaching said first 24 and second 26 opto-electric transceiver modules to said receiving sections 34, 36, by connecting the multiplexer/demultiplexer 11 to the first opto-electric transceiver module 24 via optical fibers 20, 22 and by connecting the subscriber unit 12 via the optical fibers 16, 18 to the second opto-electric transceiver module 26.

An interface device 30 of the above kind may be tested in order to make sure that the interface device 30 functions accurately. This test may be done before the interface device 30 is sold or used in the fiberoptic communication network. The testing can be done by arranging opto-electric transceiver modules 24, 26 in said first 34 and second 36 receiving sections. Furthermore, optical fibers 16, 18, 20, 22 are connected to said opto-electric transceiver modules 24, 26. The optical fibers 16, 18, 20, 22 are also connected to a test equipment. By sending appropriate optical pulses and monitoring the response in the test equipment, the function of the interface device 30 may be checked.

An interface as described above can be quite expensive. In particular the transceivers that form part of the interface are often expensive

SUMMARY OF THE INVENTION

A purpose of a first aspect of the present invention is to find a simplified manner of connecting a subscriber unit to a fiberoptic communication network by means of an interface. A further purpose is to find a manner of connecting a subscriber unit to a fiberoptic communication network, which manner allows for the use of less expensive components. Another purpose is to enable the connection between the subscriber unit and an interface device of the kind described above, without any need of using optical fibers between the subscriber unit and the interface device. A purpose of a second aspect of the invention is to find a simplified manner of testing the function of an interface device of the above kind. Another purpose of the second aspect is to provide an inexpensive manner of testing such an interface device. Further purposes and advantages of the invention will become clear from the description below.

The above purposes are achieved according to a first aspect of the invention by the method defined in the annexed claim 1. In particular, according to the method, the subscriber unit is connected to the fiberoptic communication network via a fiberoptic interface device of the kind described above adapted to function as an interface in a coarse wavelength division multiplex (CWDM) system. The first opto-electric transceiver module is arranged in said first receiving section and is connected to the fiberoptic communication network. A first electric transceiver module is provided. This electric transceiver module includes a receiver member arranged for receiving electrical signals from an electrical conduction path and for conducting corresponding electrical signals to said electric circuit arrangement, and a transmitter member for receiving electrical signals from said electric circuit arrangement and for transmitting corresponding electrical signals to an electrical conduction path. This electric transceiver module is also designed such that it may be plugged into one of said receiving sections and unplugged therefrom. This first electric transceiver module is arranged in said second receiving section and the interface device is connected, via said first electric transceiver module, to said subscriber unit via electrical conduction paths.

It should be noted that the different steps that are carried out according to the method do not necessarily have to be performed in the order in which they are stated in the claims.

Since the electric transceiver module does not include any opto-electric converters, the electric transceiver module can be produced easier and to a lower expense than a corresponding opto-electric transceiver module. Furthermore, the subscriber unit may be connected to the interface device without any need for optical fibers between the subscriber unit and the interface device. This connection can be done, for example, with the help of ordinary electric conductors, for example, via a copper cable.

It should be noted that the subscriber unit may include its own fiber optic communication network.

It should also be noted that according to one preferred embodiment the first opto-electric transceiver module and/or the first electric transceiver module are designed such that they may be plugged into the respective receiving section, and unplugged therefrom, in a quick-connect manner. However, according to an alternative embodiment the transceiver modules are designed such that they cannot be plugged into the receiving sections, or unplugged, in a quick-connect manner. According to this alternative embodiment, the transceiver modules can thus not be easily replaced, which can be done by soldering the transceiver module to the main board. The alternative embodiment makes it, for example, difficult for a client to replace a transceiver module without permission.

According to one realization of the method, said first electric transceiver module is configured such that said receiver member is a passive receiver member, which conducts the received electrical signals from the electrical conduction path to said electric circuit arrangement without providing any amplification. Such an electric transceiver module is easy and inexpensive to produce.

According to a further realization of the method, said first electric transceiver module is configured such that said transmitter member is a passive transmitter member, which conducts the received electrical signals from the electric circuit arrangement to the electrical conduction path without providing any amplification. By making the transmitter member as a passive member, the transceiver module is easy and inexpensive to produce. It is of course possible that both the receiver member and the transmitter member are passive members.

According to another alternative realization of the method, said first electric transceiver module is configured such that said receiver member is an active receiver member, which provides an amplification of the received electrical signals from the electrical conduction path before the signals are conducted to said electric circuit arrangement. By using such an active receiver member, signals from the subscriber unit may be amplified before being conducted to the electric circuit arrangement. It should be noted that the concept "amplification" includes in this document also the possibility that the amplification is negative, i.e. a reduction of the signal level. By an active member is thus meant that the member includes means for actively modify the signal.

According to a further realization of the method, said first electric transceiver module is configured such that said transmitter member is an active transmitter member, which provides an amplification of the received electrical signals from the electric circuit arrangement before the signals are conducted to the electrical conduction path A suitable amplification is thus performed before the signals are transmitted to the subscriber unit.

According to a still further realization of the method, each of said first and second receiving sections is configured to receive a transceiver module of a standardized size. This has the advantage that standard module receptacles may be used.

According to another realization of the method, said first opto-electric transceiver module is connected to said fiberoptic communication network via a multiplexer/demultiplexer. This makes it possible to connect a plurality of subscriber units to the fiberoptic communication network.

According to still another realization of the method, said interface device, together with said attached first opto-electric transceiver module and said attached first electric transceiver module, is arranged to adapt the signals from said subscriber unit before transmitting the signals to said multiplexer/demultiplexer, and also to adapt signals from said multiplexer/demultiplexer before they are transmitted to said subscriber unit. As has been mentioned above, the adaptation may include wavelength conversion, amplification, noise reduction etc.

According to another realization of the method, said interface device includes a circuit board, on which said electric circuit arrangement, said first receiving section and said second receiving section are arranged. By arranging the components on a circuit board, the interface device may be produced in an efficient and inexpensive manner.

The second aspect of the invention is achieved by the method defined in claim 10. In particular, according to this method an interface device of the kind described above is tested by providing a first electric transceiver module of the kind described above. This electric transceiver module is arranged in said first or second receiving section such that the first electric transceiver module is connected to said electric circuit arrangement. This electric transceiver module is connected, via electrical conduction paths, to a test equipment. The functionality of said interface device is tested with the help of the test equipment. The interface device is thus connected to the test equipment by an electric transceiver module. This simplifies the testing of the interface device.

According to a preferred realization of the second aspect of the invention, also a second electric transceiver module, similar to the first electric transceiver module, is provided. The second electric transceiver module is arranged in the other of said first and second receiving sections such that also the second electric transceiver module is connected to said electric circuit arrangement. The second electric transceiver module is also connected, via electrical conduction paths, to said test equipment. By using two electric transceiver modules, the testing may be carried out without any need for opto-electrical conversion.

Different advantageous manners of carrying out the method according the second aspect of the invention, are clear from the remaining dependent claims. By these different realizations of the method, advantages corresponding to those described above are achieved.

DESCRIPTION OF REALIZATIONS OF THE INVENTION

Figure 3:
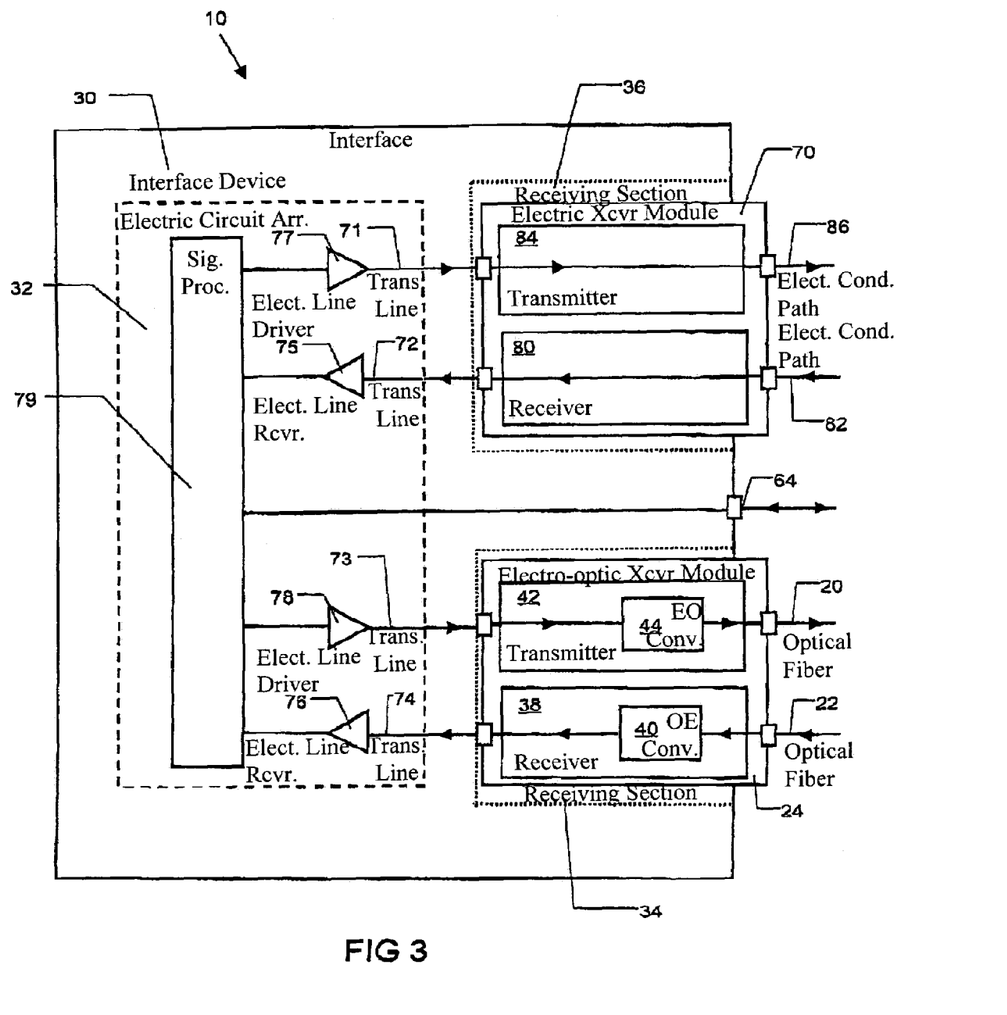
FIG. 3 illustrates the arrangement of an interface in accordance with the method of the present invention.

A method according to the invention will now be explained with reference to FIG. 3. FIG. 3 shows the arrangement of an interface device 30 together with attached transceiver modules 24, 70. This arrangement illustrated in FIG. 3 is connected to a subscriber unit 12 and to a fiberoptic communication network 14 in the same manner as is illustrated in FIG. 1.

According to the method, an interface device 30 is provided. The interface device 30 comprises an electric circuit arrangement 32. The electric circuit arrangement 32 is designed such that the interface device 30 is adapted to function as an interface device 30 in a CWDM system. The electric circuit arrangement 32 may comprise internal transmission lines 71–74, electric line receivers 75, 76, electric line drivers 77, 78 and signal processing means 79. The interface device also comprises a first receiving section 34 and a second receiving section 36. The receiving sections 34, 36 are preferably configured to receive a transceiver module 24, 70 of a standardized size. Such a transceiver module is configured with connecting means that is also arranged according to some standard. The transceiver module may for example be configured according to the Small Form-factor Pluggable (SPF) Transceiver Multisource Agreement (MSA). The receiving sections 34, 36 are, according to one embodiment, designed such that the first and second transceiver modules 24, 70 may be plugged into the respective receiving section 34, 36 and unplugged therefrom in a quick-connect manner, i.e. it is not necessary to use soldering to attach the transceiver modules 24, 70.

Preferably, the interface device 30 includes a circuit board, on which said electric circuit arrangement 32 and said first 34 and second 36 receiving sections are arranged. The interface device 30 may also include an input/output 64 connected to the signal processing means 79 and arranged to be connected to a network management system (NMS) which can communicate with the interface device 30 in order to control the same.

Each of the receiving sections 34, 36 is thus designed to be able to receive an opto-electric transceiver module of the kind described above in connection with the description of the prior art. According to the method of the present invention, one such opto-electric transceiver module 24 is arranged in said first receiving section 34. This opto-electric transceiver module 24 thus includes a receiver unit 38 for receiving optical signals from an optical conduction path 22. The receiver unit 38 comprises an opto-electrical converter 40 for converting the received optical signals to electrical signals adapted to be conducted to the electric circuit arrangement 32. The opto-electric transceiver module 24 also includes a transmitter unit 42 for transmitting optical signals to an optical conduction path 20, The transmitter unit 42 comprises an electro-optical converter 44 for converting electrical signals, received from the electric circuit arrangement 32, two optical signals before they are transmitted to the optical conduction path 20.

According to the present invention, the opto-electric transceiver module 24 is preferably connected to the fiberoptic communication network 14 via a multiplexer/demultiplexer 11 (in the same manner as illustrated in FIG. 1). The optical conduction paths 20, 22 preferably comprises optical fibers.

According to the invention, a first electric transceiver module 70 is provided. This electric transceiver module includes a receiver member 80 arranged for receiving electrical signals from an electrical conduction path 82 and for conducting corresponding electrical signals to the electric circuit arrangement 32. The electric transceiver module 70 also includes a transmitter member 84 for receiving electrical signals from the electric circuit arrangement 32 and for transmitting corresponding electrical signals to an electrical conduction path 86. Preferably, also the first electric transceiver module 70 is of a standardized size such that is may be plugged into one of the receiving sections 34, 36 and unplugged therefrom in a quick-connect manner.

According the invention, the first electric transceiver module 70 is arranged in the second receiving section 36. Furthermore, the interface device 30 is connected to the subscriber unit 12 via the first electric transceiver module 70 and the electrical conduction paths 82, 86. The invention thus provides a simplified and inexpensive manner of connecting the subscriber unit 12 to the optical communication network 14, since only one opto-electric transceiver module 24 is used in the interface 10. Another corresponding electric transceiver module 70 may also be arranged and plugged into a section in the subscriber unit 12.

If the distance between the subscriber unit 12 and the interface device 30 is relatively short, the receiver member 80 and/or the transmitter member 84 may be formed as passive members. This means that the receiver member 80 is designed to conduct the received electrical signals from the electrical conduction path 82 to the electric circuit arrangement 32 without providing any amplification. If also the transmitter member 84 is a passive member, the transmitter member 84 conducts the received electrical signals from the electric circuit arrangement 32 to the electrical conduction path 86 without providing any amplification. It should be noted that by amplification is in this document meant that the amplitude or shape of the signals are modified by an active circuit arrangement. Amplification does not necessarily mean that the amplitude is increased (i.e. the concept as used herein also includes a negative amplification). If both the receiver member 80 and the transmitter member 84 are passive members, the electric transceiver module 70 may thus simply include two electrical conductors without any further circuit arrangement arranged in the transceiver module 70.

Figure 4:
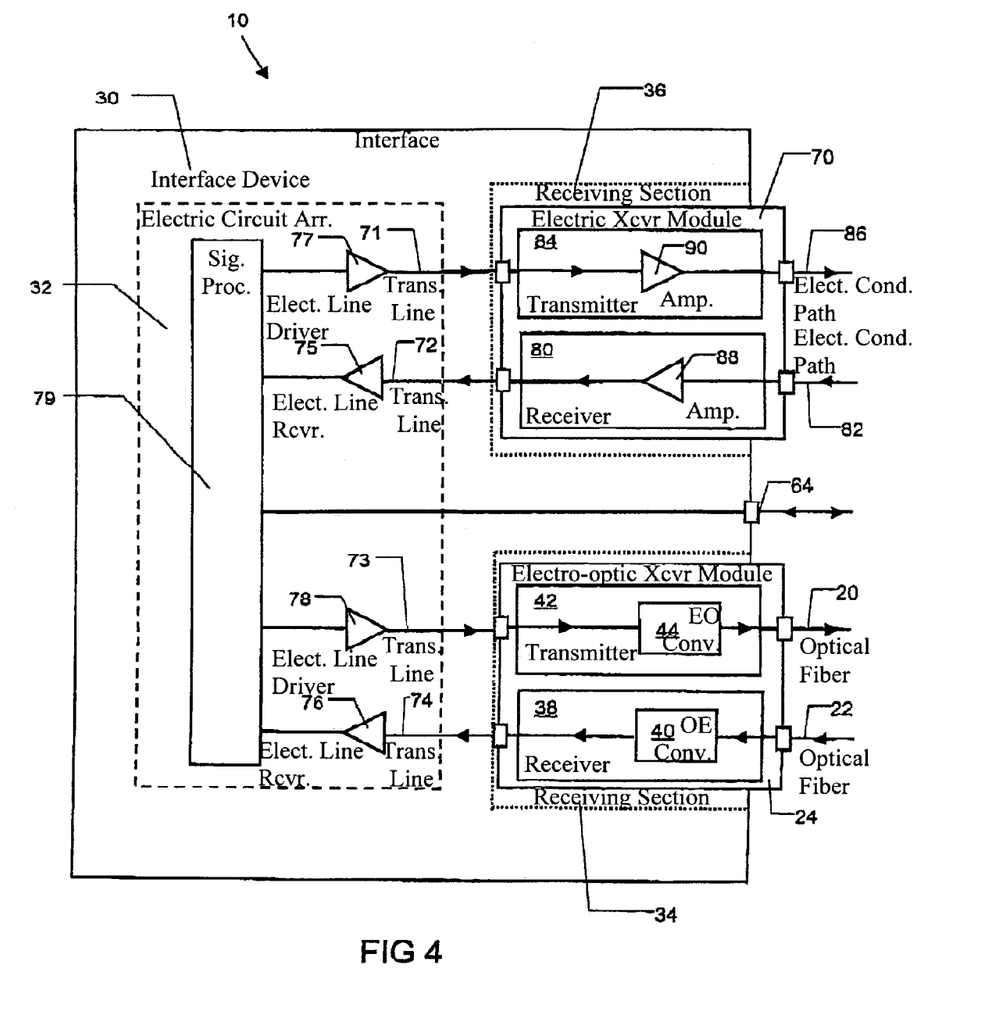
FIG. 4 illustrates an alternative arrangement according to the present invention.

However, in case the distance between the subscriber unit 12 and the interface device 30 is somewhat longer, the receiver member 80 and/or the transmitter member 84 may be active members. This possibility is illustrated in FIG. 4. FIG. 4 thus illustrates that the receiver member 80 includes an amplification circuit 88. The receiver member 80 thus provides an amplification of the received electrical signals from the electrical conduction path 82 before the signals are conducted to the electric circuit arrangement 32. FIG. 4 also illustrates that the transmitter member 84 may include an amplification circuit 90, which provides an amplification of the received electrical signals from the electric circuit arrangement 32 before the signals are conducted to the electrical conduction path 86. The amplification circuits may for example constitute an adaptive equalizer positioned in the transceiver module 70. One example of such an equalizer is the equalizer MAX 3801 sold by Maxim integrated Products, Sunnyvale, Calif.

The interface device 30 together with the attached transceiver modules 24, 70 is arranged to adapt the signals from the subscriber unit 12 before transmitting the signals to the multiplexer/demultiplexer 11, and also to adapt signals from the multiplexer/demultiplexer 11 before they are transmitted to the subscriber unit 12. As mentioned above, the adaptation may include wavelength conversion, amplification, noise reduction etc.

The distance between the subscriber unit 12 and the interface device 30, i.e. the length of the bi-directional electrical conduction path 82, 86 may typically be 0–100 m, preferably 1–20 m. If a purely passive transceiver module 70 is used, said distance is preferably less than 3 m. The electrical conductors 82, 86 may for example constitute two coaxial cables.

The interface device 30 according to the invention, together with attached transceiver modules 24, 70, is designed to enable a transmission speed between the subscriber unit 12 and the network 14 of at least 100 Mbit/s.

Figure 5:
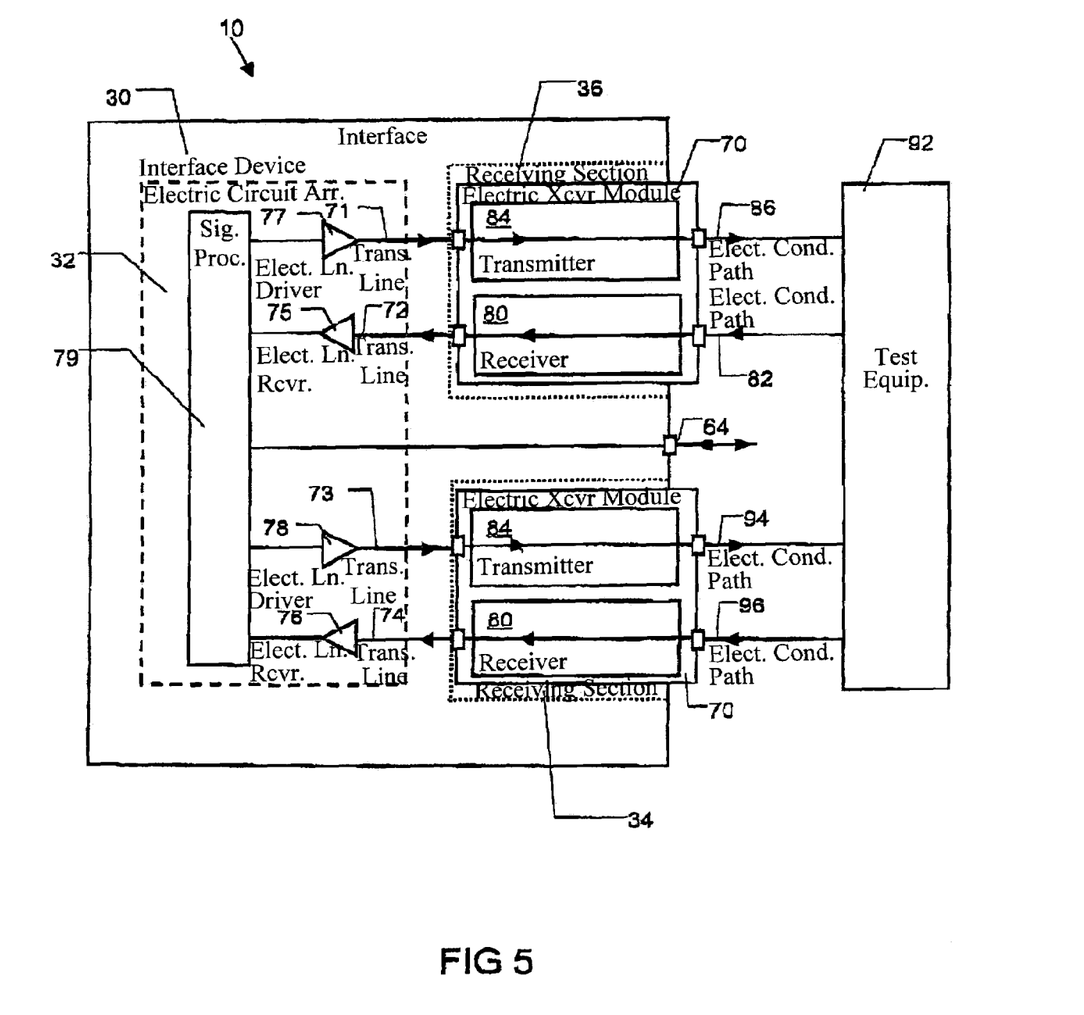
FIG. 5 illustrates the arrangement of an interface in relation to a test equipment according to another method according to the present invention.

The invention also concerns a method of testing the function of an interface device 30. The arrangement according to this method is illustrated in FIG. 5. The interface device 30 used is the same as the one described above.

According to the method of testing the interface device 30, an electric transceiver module 70 of the kind described above is arranged in at least one of said first 34 and second 36 receiving sections such that the electric transceiver module 70 is connected to the electric circuit arrangement 32. The electric transceiver module is then connected, via electrical conduction paths 82, 86 to a test equipment 92. The function of the interface device 30 is then tested with the help of the test equipment 92. The test equipment 92 may constitute a computer controlled test equipment of the kind known to the person skilled in the art for testing electrical circuits According to a preferred embodiment, two such electric transceiver modules 70 are used when testing the interface device 30. That is, one electric transceiver module 70 is attached to each of the receiving sections 34, 36 and connected to the test equipment 92 via electrical conduction paths 82, 86, 94, 96. Also according to the method of testing the interface device 30, the respective receiver members 80 and transmitter members 84 in the transceiver modules 70 may be active or passive as has been explained above. The interface device 30 and the transceiver modules 70 are preferably designed and configured in the manner described above.

The present invention is not limited to the disclosed examples, but may be modified and varied within the scope of the annexed claims.

The invention claimed is:

1. A method of connecting a subscriber unit to a fiberoptic communication network via a fiberoptic interface device adapted to function as an interface device in a coarse wavelength division multiplex (CWDM) system, the method comprising:

providing an electric circuit arrangement, providing a first receiving section adapted to receive a first opto-electric transceiver module including a first receiver unit for receiving optical signals from an optical conduction path, the first receiver unit comprising a first opto-electrical converter for converting the received optical signals to electrical signals, which are adapted to be conducted to said electric circuit arrangement, and a first transmitter unit for transmitting optical signals to an optical conduction path, the first transmitter unit comprising a first electro-optical converter for converting electrical signals, received from said electric circuit arrangement, to optical signals before they are transmitted from the transmitter unit, providing a second receiving section adapted to receive a second opto-electric transceiver module including a second receiver unit for receiving optical signals from an optical conduction path, the second receiver unit comprising a second opto-electrical converter for converting the received optical signals to electrical signals, which are adapted to be conducted to said electric circuit arrangement, and a second transmitter unit for transmitting optical signals to an optical conduction path, the second transmitter unit comprising a second electro-optical converter for converting electrical signals, received from said electric circuit arrangement, to optical signals before they are transmitted from the transmitter unit, wherein said first and second receiving sections are designed such that said first and second opto-electric transceiver modules are configured to be plugged into the respective receiving section and unplugged therefrom in a quick-connect manner, and wherein each of said first and second receiving sections is configured to receive a transceiver module of a standardized size, arranging said first opto-electric transceiver module in said first receiving section and connecting this first opto-electric transceiver module to said fiberoptic communication network, providing a first electric transceiver module including
- a receiver member arranged for receiving electrical signals from an electrical conduction path and for conducting corresponding electrical signals to said electric circuit arrangement, and
- a transmitter member for receiving electrical signals from said electric circuit arrangement and for transmitting corresponding electrical signals to an electrical conduction path, wherein said first electric transceiver module is also designed such that it is configured to be plugged into one of said receiving sections and unplugged therefrom, arranging said first electric transceiver module in said second receiving section rather than the second opto-electric transceiver module, and connecting said interface device, via said first electric transceiver module, to said subscriber unit via electrical conduction paths.

2. A method according to claim 1, wherein said first electric transceiver module is configured such that said receiver member is a passive receiver member, which conducts the received electrical signals from the electrical conduction path to said electric circuit arrangement without providing any amplification.

3. A method according to claim 1, wherein said first electric transceiver module is configured such that said transmitter member is a passive transmitter member, which conducts the received electrical signals from the electric circuit arrangement to the electrical conduction path without providing any amplification.

4. A method according to claim 1, wherein said first electric transceiver module is configured such that said receiver member is an active receiver member, which provides an amplification of the received electrical signals from the electrical conduction path before the signals are conducted to said electric circuit arrangement.

5. A method according to claim 1, wherein said first electric transceiver module is configured such that said transmitter member is an active transmitter member, which provides an amplification of the received electrical signals from the electric circuit arrangement before the signals are conducted to the electrical conduction path.

6. A method according to claim 1, wherein said first opto-electric transceiver module is connected to said fiberoptic communication network via a multiplexer/demultiplexer.

7. A method according to claim 6, wherein said interface device, together with said attached first opto-electric transceiver module and said attached first electric transceiver module, is arranged to adapt the signals from said subscriber unit before transmitting the signals to said multiplexer/demultiplexer, and also to adapt signals from said multiplexer/demultiplexer before they are transmitted to said subscriber unit.

8. A method according to claim 1, wherein said interface device includes a circuit board, on which said electric circuit arrangement, said first receiving section and said second receiving section are arranged.

* * * * *